(No Model.)
S. N. HOWARD.
ANIMAL POKE.
No. 285,268. Patented Sept. 18, 1883.
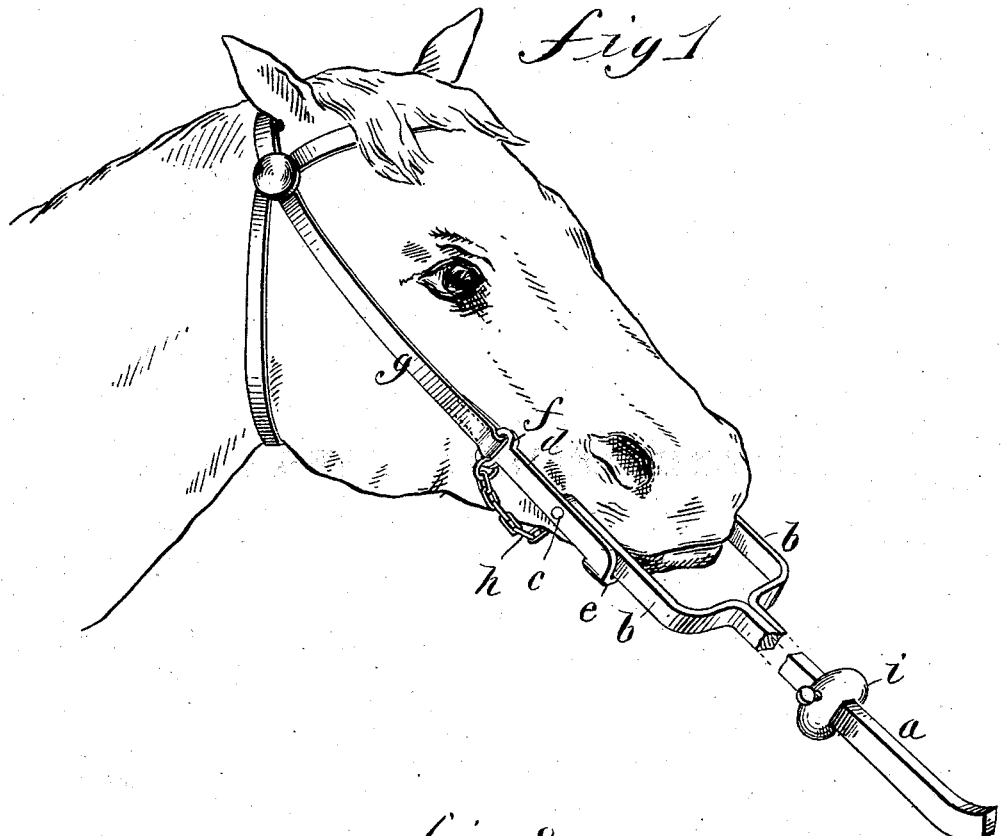
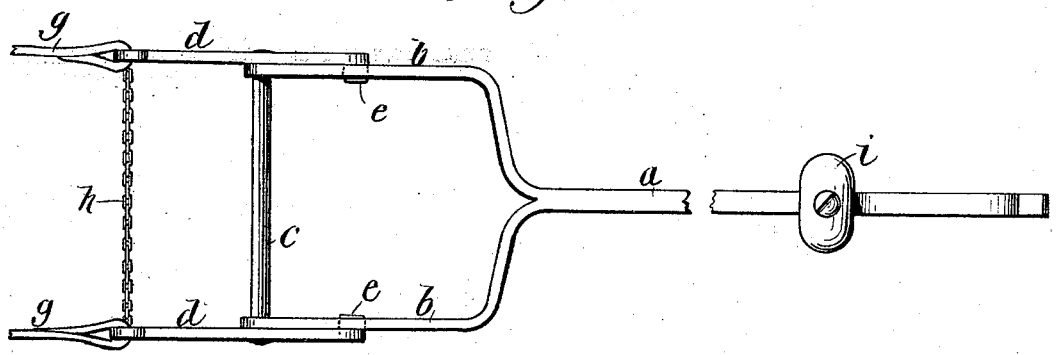
WITNESSES:
INVENTOR: S. N. Howard
BY Munn & Co.
ATTORNEYS.

UNITED STATES PATENT OFFICE.

STEPHEN N. HOWARD, OF EATONTON, GEORGIA.

ANIMAL-POKE.

SPECIFICATION forming part of Letters Patent No. 285,268, dated September 18, 1883.

Application filed January 18, 1883. (No model.)

*To all whom it may concern:*

Be it known that I, STEPHEN N. HOWARD, of Eatonton, in the county of Putnam and State of Georgia, have invented a new and Improved Animal-Poke, of which the following is a full, clear, and exact description.

My invention consists of a forked bar having an adjustable weight, and being pivoted to a bit of a headstall in such manner that it does not materially interfere with grazing by the animal, but so that in case he raises his head above the natural position—as for throwing down fences and jumping—it strains a curb-chain under the animal's lower jaw in a manner to restrain him from the same, all as hereinafter fully described.

Reference is to be had to the accompanying drawings, forming part of this specification, in which similar letters of reference indicate corresponding parts in both the figures.

Figure 1 is a perspective view of my improved animal-poke as applied to the head of a horse. Fig. 2 is a plan of the poke.

I take a metal bar, $a$, of about twenty inches in length, (more or less,) and make forks or branches $b$ at one end, suitably for extending up each side of the mouth to a bit, $c$, to which I pivot said branches, the bit being rigidly connected to two cheek-bars, $d$, which extend downward from the bit a suitable distance, and have a lug, $e$, at the lower end, for limiting the downward swing of the poke-bar. They also extend upward about the same distance, or a little more, and terminate in loops $f$, to which the cheek-straps $g$ of a headstall are connected for securing the bit in the animal's mouth. The said upper ends are also connected together by a curb-chain, $h$, passing under the lower jaw. The poke-bar is pro-vided with an adjustable weight, $i$, to be set more or less distance from the pivot, according to the tension it may be desired to apply to the curb-chain. When applying the device, I adjust the curb-chain so that when the animal holds his head in the natural position the chain will not draw against the jaw by the effect of the weighted poke-bar, which turns on the bit as a fulcrum when the animal raises his head above the point where the forks rest on the lugs $e$. Then when he attempts to push down a fence or to raise his head for jumping the weighted bar will draw the chain so powerfully as to cause him to cease such attempts. For grazing the bar will rest on the ground, and the forks will rise on the pivots sufficiently to allow the animal's nose to reach below the forks to the ground.

Having thus fully described my invention, I claim as new and desire to secure by Letters Patent—

1. The combination of the forked bar $a$, bit $c$, cheek-irons $d$, curb-chain $h$, and the cheek-straps $g$ of a headstall, substantially as described.

2. The forked rod $a$, pivoted to the bit $c$, and resting on the lugs $e$ of the cheek-irons, said irons being attached to cheek-straps $g$, and being provided with the curb chain, substantially as described.

3. The combination of a forked bar, $a$, having an adjustable weight, $i$, with the bit $c$, cheek-irons, cheek-straps, and the curb-chain $h$, substantially as described.

STEPHEN N. HOWARD.

Witnesses:
W. F. JENKINS,
THOS. K. LITTLE.